May 5, 1959     E. O. MARTINSON     2,885,043

AUTOMATIC DRIVING MECHANISM

Filed April 22, 1953     6 Sheets-Sheet 1

INVENTOR.
E. O. Martinson
BY Robb & Robb
Attorneys

May 5, 1959    E. O. MARTINSON    2,885,043
AUTOMATIC DRIVING MECHANISM Filed April 22, 1953           6 Sheets-Sheet 2

INVENTOR.
E. O. Martinson
BY Robb & Robb
Attorneys

May 5, 1959 — E. O. MARTINSON — 2,885,043
AUTOMATIC DRIVING MECHANISM
Filed April 22, 1953 — 6 Sheets-Sheet 5

INVENTOR.
E. O. Martinson
BY Robb & Robb
Attorneys

May 5, 1959 E. O. MARTINSON 2,885,043
AUTOMATIC DRIVING MECHANISM
Filed April 22, 1953 6 Sheets-Sheet 6

INVENTOR.
E. O. Martinson
BY Robert Robb
Attorneys

United States Patent Office 2,885,043
Patented May 5, 1959

2,885,043
AUTOMATIC DRIVING MECHANISM

Edwin O. Martinson, Milwaukee, Wis., assignor to Koehring Company, Milwaukee, Wis.

Application April 22, 1953, Serial No. 350,368

10 Claims. (Cl. 192—13)

My present invention involves improvements in power transmitting couplings and in one aspect relates to improvements in the transmission of power and control in driving, steering, and braking of traction vehicles or machines wherein automatic instrumentalities are employed to control movement of the traction members thereof.

Machines of the above class may be power shovels or cranes, or other types of machines such as pavers, or the like, commonly mounted upon crawlers or endless tracks as the traction means.

This invention is not confined to use with crawler supported machines, however, since the improvements hereof are equally applicable to vehicles or machines supported upon wheels at opposite sides thereof, suitably driven as by means of a traction shaft adapted to be operably connected to, or disconnected from, the driving power unit or motor being carried on the body of the machine.

It is an object of the present invention to provide a novel mechanism which will instantly brake a driven or power output member against further movement in any direction if power is not being transmitted through the mechanism to the output member. A related object is to provide such a mechanism in which the output member is instantly released for movement when power is transmitted through the mechanism to the output member.

Another object of the present invention is to provide a power transmitting and braking mechanism for the traction members of a vehicle or machine which is instantly caused to brake the traction member at any time the machine tends to move and power is not being applied from the engine or motor of the vehicle or machine. A corollary aim of the invention is to assure that the vehicle or machine may be caused to move in exact response to the control of the operator by the application of power through the mechanism, which power will instantly release the braking force on the traction members of the vehicle or machine.

Still another object is to provide a novel power transmitting and braking mechanism which may be incorporated in a unit associated with the driving members and traction members of a vehicle or machine. It is also contemplated that such units so arranged will provide a braking action effective if the vehicle or machine begins to move in the absence of a power drive force, and that the application of a power drive force to selected one or more of the units will effect release and continued de-energization of the braking action of the selected unit or units thereby to increase and facilitate both the directional control and stopping of the vehicle or machine during movement from place to place.

A more detailed object of the present invention is to provide power transmission and brake mechanisms in which the braking forces are applied to brake bands or members with positive mechanical power initiated into operation and maintained effective to give maximum braking action by servo action operation of the brake members working in conjunction with relatively powerful lever units and linkage elements causing the automatic application of the brake bands, or equivalent brake means, to suitable brake drums forming parts of said power transmitting and brake mechanisms.

Additionally, it is an object of the present invention to provide novel power transmitting mechanism for traction vehicles and machines in which brakes are provided and adapted to be automatically released on the application of the driving power to traction members on opposite sides of the vehicle or machine, as required for forward or reverse travel of the vehicle or machine, or one brake may be energized when its power transmitting mechanism is disconnected from the driving power, to obtain controlled steering movement of the machine equipped with the invention, as before generally outlined.

The invention hereof also involves other features of construction and operation as will fully appear on reference to the following detailed description of the preferred embodiment thereof, in conjunction with the accompanying drawings in which.

Figure 1:
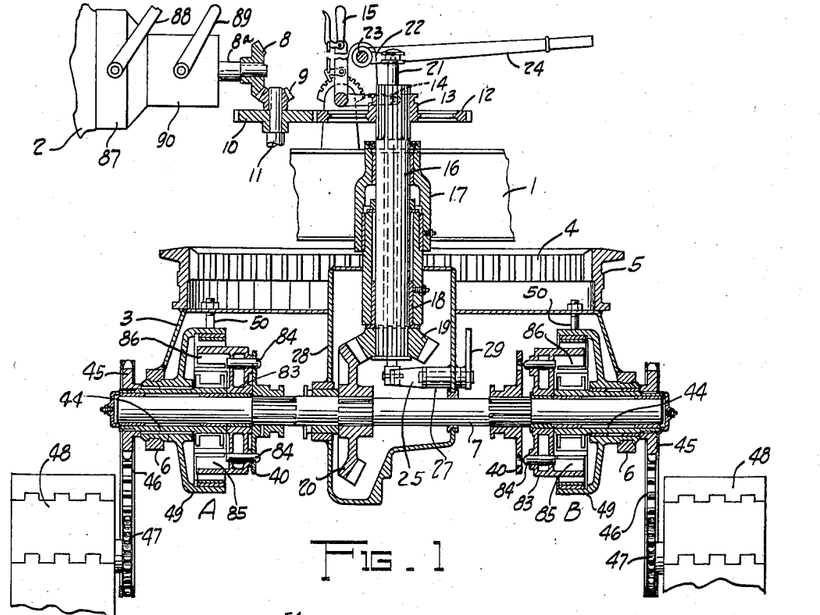
Figure 1 is a general vertical sectional view showing a shovel type crane embodying the present invention with its super-structure or body, and base structure, partly broken away.

Referring to Fig. 1 in more detail, there is shown a power shovel or similar machine in conjunction with which an illustrative embodiment of the present invention is employed. The detailed features of the illustrated machine are only fragmentarily illustrated in Figure 1 of the drawing. Such machines are conventional and well-known in the art as comprising usually an upper body frame designated 1 in Figure 1 of the drawings customarily supported to rotate on the base or traction under frame, said body frame supporting the platform on which the motor 2 of the machine is carried, said motor being adapted to be drivingly connected to the traction means of the machine for propelling the latter and also having the usual drive gearing, not illustrated, for connecting the motor with the cable drums in the cab of the upper body frame, and other instrumentalities for operating digging devices ordinarily mounted upon a suitable boom supported on said body frame. Although the invention is illustrated in connection with a crane, it will be understood that the same is adapted for use in conjunction with any traction vehicles which utilize separate driving gears or elements usually located at opposite sides thereof for driving of the traction devices themselves which may be crawlers or the like.

The upper or body frame of the machine as seen in Figure 1 is mounted upon the lower or traction frame 3 of the machine which frame supports the combined swing gear 4 and roller track 5 employed in the usual manner, rollers supported on the upper frame 1, not shown, engaging the track 5 and largely affording the supporting means by which the upper frame or body of the machine is carried on the lower traction base frame. Supported indirectly by suitable bearings 6 provided in the lower frame 3 is the transverse traction or drive shaft 7 upon opposite ends of which or at opposite ends of which are mounted combination brake and clutch units which are generally designated in Figure 1 at A and B, said units being of identical construction as will be more fully described hereinafter.

For carrying the drive of the motor 2 down to the traction shaft 7 any suitable drive gearing and shaft instrumentalities may be employed, those illustrated being conventional and including a bevel-gear 8 on the motor shaft 8a meshing with a bevel-gear 9 on a vertical shaft which carries the spur-gear 10, said vertical shaft being numbered 11 and carried in suitable bearings on the upper frame not illustrated. Adapted to mesh with the spur-gear 10 is a large drive gear 12 having a shifting sleeve 13 formed therewith operable by a shifting yoke 14. The lever 15 or any suitable operating instrumentality is connected to the shifting yoke 14 for raising and lowering the gear 12 whereby to place the same in mesh or out of mesh with respect to the driving spur-gear 10.

The driving gear 12 is splined to the hollow vertical shaft 16 which passes down through the center pin housing 17 on the upper frame 1 and also through the bearing sleeve 18 mounted on the lower frame 3. At its lower end the shaft 16 carries a traction driving gear 19 which meshes with a corresponding driven bevel-gear 20 which is splined to the traction shaft 7 for rotation with the latter.

In the illustrative machine, means are provided for controlling the movement or travel of the machine. In the present instance the means includes a reach rod 21 which extends down from the upper body or frame 1 of the machine through the hollow shaft 16. On the upper end of the reach-rod 21 is connected an arm 22 carried by a short horizontal shaft 23 on which is mounted the operating lever 24. Up and down movements of the lever 24 will rock the arm 22 so as to raise and lower respectively the reach-rod 21 which operation is employed for the actuation of certain control clutch units, hereinafter described.

Figure 2:
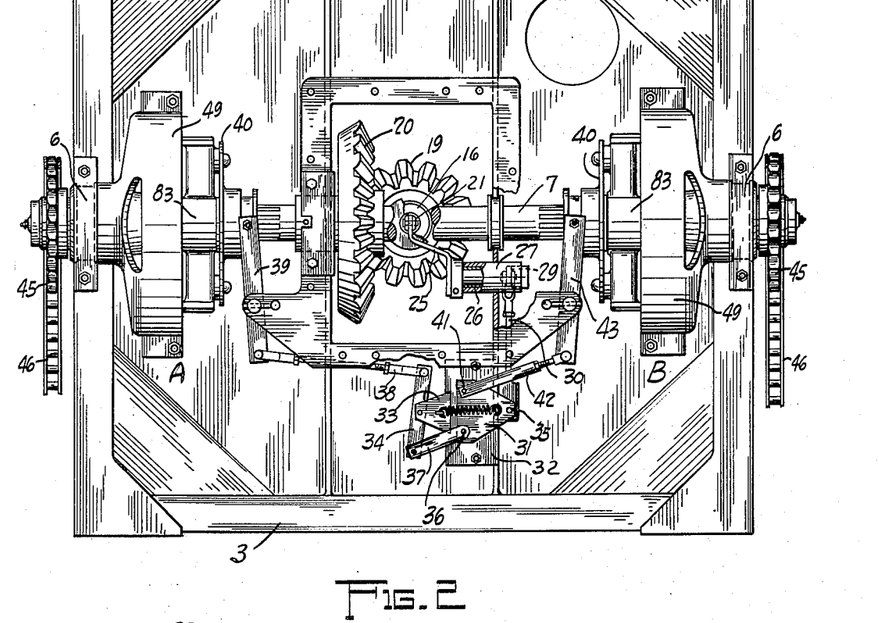
Figure 2 is a general bottom plan view of the lower frame or chassis of the machine showing certain of the features illustrated in Figure 1, primarily the brake and clutch units on the traction shaft, and the operating levers and links which are actuated by the reach-rod that passes down through the center pin of the machine.
Figures 12, 13:
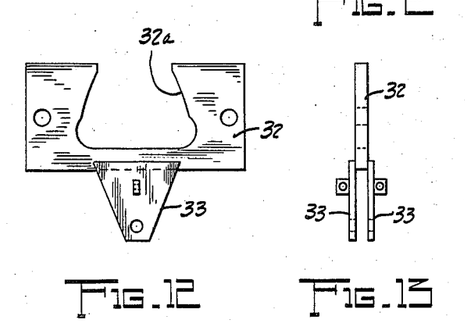
Figure 12 is a detailed top plan view of a fulcrum plate employed for supporting certain parts of the connections used for operating the main clutch members.
Figure 13 is a view in edge elevation of the plate shown in Figure 12.
Figure 14:
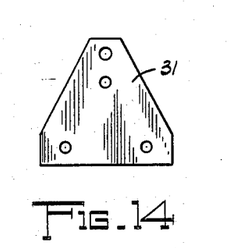
Figure 14 is a plan view of one of the floating link plates, two of which are supplied, one above the fulcrum plate and the other beneath the same.

At its lower end the reach-rod 21 is pivotally connected to an angularly bent arm 25 seen in Figure 2 as mounted upon a short horizontal shaft 26 supported in a suitable bearing 27 carried by a housing 28 which is rigidly mounted on the lower frame in any suitable manner. The shaft 26 at the end opposite to that which is fixed to the arm 25 carries a vertical arm 29 also fixed to the shaft and said arm 29 in turn is connected by a rod 30 to corresponding end of floating link plates 31 seen best in Figure 2 of the drawing. The link plates 31 are mounted upon opposite sides, or in other words at the top and bottom sides of a fulcrum plate 32 which is rigidly attached to an adjacent portion of the base frame as by welding or the like, said fulcrum plate as seen in Figures 12 and 13 having the spaced fulcrum extensions 33 between which is pivoted a lever 34. As seen in Figure 2 the right-hand ends of the floating link plates 31 are connected together by a pivot pin 35 which forms the pivotal connection between said plates and the shift rod 30. As viewed in Figure 2 also it will be seen that the floating link plates 31 have pivot pin 36 connecting corresponding side portions thereof for pivotally attaching thereto a shifting link 37 that is attached at its opposite end to one end of the lever 34. The other end of the lever 34 is connected by adjustable rod or similar member 38 with the shifting yoke 39 which engages the grooved shifting collar integral with the movable jaw clutch member 40 of the clutch associated with the unit designated A in Figure 1 and which will be shortly described as to its detail construction. It will also be noted that the floating link plates 31 on the fulcrum plate 32 have pivot pin 41 at the side portions thereof opposite those having the pin 36, and said pin 41 is a member for pivotally attaching one end of the shift rod 42 to said link plates, the opposite end of the rod 42 being pivotally connected to the shifting yoke 43 engaging the grooved shifting collar of the movable jaw clutch member 40 associated with the unit designated B.

Referring in more detail to the construction of the fulcrum plate 32, as this plate is seen in Figure 2, it is provided with a cut-off portion leading from the right edge thereof, best shown in Figure 12, said cut-off portion being of somewhat triangular form and designated 32a. The opposite sides of the cut-off portion 32a in the fulcrum plate 32 form guide portions for guidingly engaging the pins 36 and 41 by which the link 37 and the shift rod 42 are connected with the floating link plate 31.

Figures 3, 15, 16, 17:
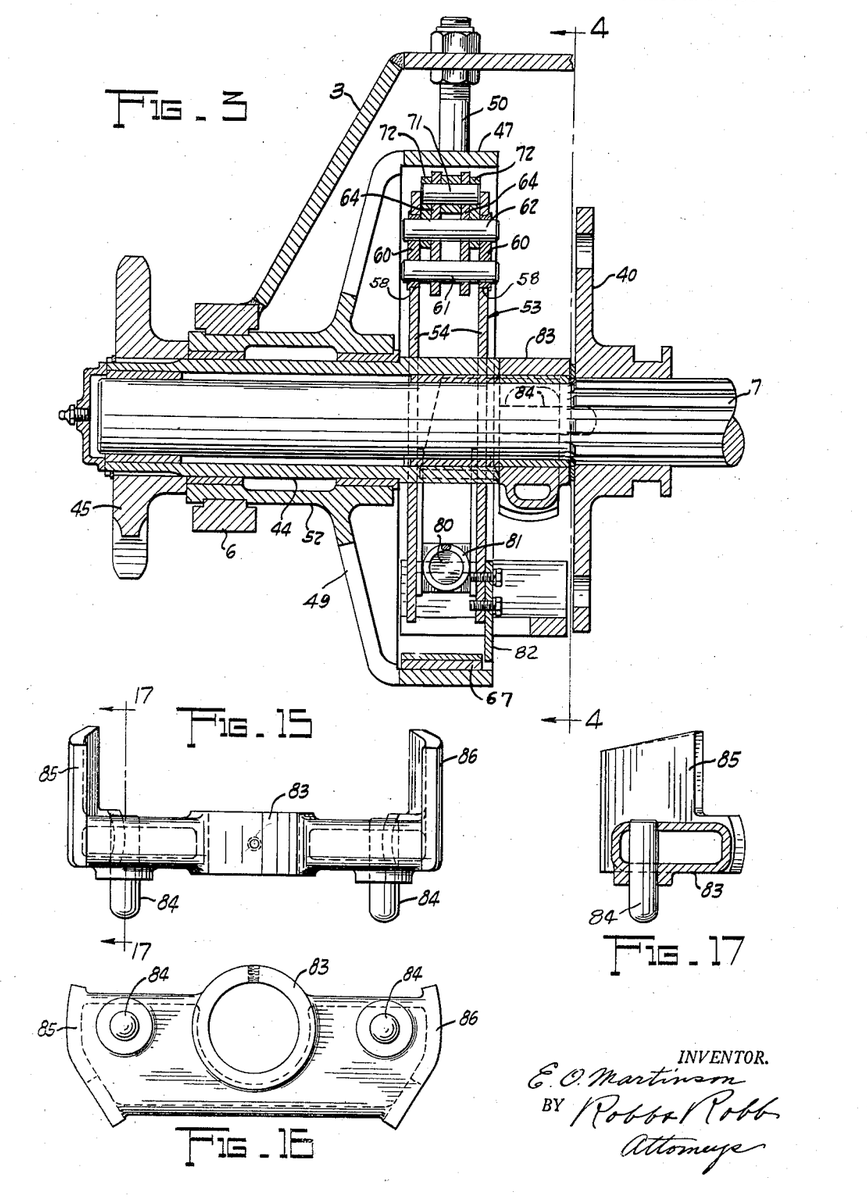
Figure 3 is a vertical sectional view taken about on the line 3—3 of Figure 4 looking in the direction of the arrows and showing particularly one of the brake and clutch units, the lower right hand portion of the main spider being broken away to bring out a little more clearly the mounting of the spring means at the lower portion of the unit.
Figure 15 is a top plan view of the floating clutch member which in reality is a double clutch member as will be apparent as the description herein proceeds.
Figure 16 is a view in side elevation of the double clutch member of Figure 15.
Figure 17 is a sectional view of the member illustrated by the Figures 15 and 16 and taken about on the line 17—17 of Figure 15 looking in the direction of the arrows.

The construction of my novel power transmitting and brake units will now be described, and particularly the unit designated A in Figure 1, but it will be understood that the unit B is of substantially the same and in fact of identical construction with the unit A making it unnecessary to refer to the details of the unit B. Reference is now made particularly to Figures 3 to 8 inclusive of the drawings from which it will be observed that the movable jaw clutch member 40 is keyed or splined to shaft 7 for rotation thereby when the shaft is driven in either of opposite directions. The combined units being described as seen in Figure 3 comprise a sleeve 44 mounted on one end of the shaft 7 for rotation relative thereto and adapted to be clutched for rotation with said shaft. On the outer end of the sleeve 44 is carried the driving gear or sprocket 45 which in respect to a crawler mounted vehicle is engaged with a driving sprocket chain 46 in turn connected with a driving sprocket or tumbler 47 fixed on a suitable supporting shaft in the frame of the crawler about which the crawler shoes or so-called track 48 moves, the latter part being somewhat diagrammatically illustrated in Figure 1 of the drawings.

Intermediate the clutch jaw 40 and the driving sleeve 44, mechanism is provided for transmitting power from the traction drive shaft 7 to the driving gear 45 and for braking the driving gear 45 when power is not being transmitted. The mechanism of the illustrative embodiment of the invention is shown encased in a stationary drum 49 which, in the exemplary construction, forms part of a means for braking the sleeve 44 and driving gear 45 of the machine. The stationary drum 49 is mounted on the lower traction frame 3 of the machine and is primarily supported from the frame 3 by means of the suspension bolts 50 connected with the forward and rearward sides of said drum 49, suitable lugs 51 projecting from said portions of the drum and being suitably attached to said bolts 50. The drum 49 is additionally supported by means of a central outstanding bearing member 52 through which the traction shaft 7 passes, said bearing sleeve 52 passing also through the main outboard bearing 6 of the under frame 3 through which said shaft 7 extends.

Figure 10:
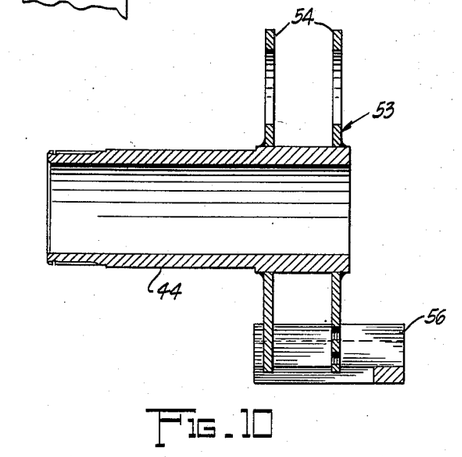
Figure 10 is a vertical sectional view of the main spider comprising spaced side plates or members supported on a sleeve and showing one of the abutments two of which are carried at the lower end of the spider.
Figure 11:
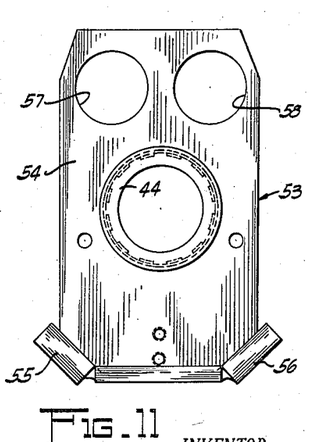
Figure 11 is a side view of the main spider as shown in Figure 10.

As seen best in Figures 3 to 6 inclusive there is provided a power output member for transmitting power to the driving sleeve 44 which forms an output shaft and which in turn delivers power to the driving gear 45. In the present instance, the output member is mounted within the brake drum 49 and is in the form of a main spider 53 which is of somewhat rectangular conformation and composed of spaced side plates 54 connected together at their central portions by the sleeve 44 previously referred to, and thus fixed to said sleeve, it being borne in mind that the sleeve 44 has keyed or otherwise fixed thereto the associated driving gear or sprocket 45. Means for coupling the output member of spider to a source of power are provided at one end of the main spider 53 in the form of spaced abutments 55 and 56 which may be welded or otherwise attached to the spider. The abutments 55 and 56 as seen in Figure 10 project laterally some distance from the outer side of the innermost side plate 54 of the spider.

Means are also provided for actuating the brake means. In the illustrative embodiment of the invention, the brake applying means comprises an expandable linkage associated with the output member or spider 53. In more detail, the linkage is adapted to change its shape or configuration upon movement of the spider 53 relative to the brake means and is both pivotally connected to the spider and operatively associated with the brake means.

Figure 4:
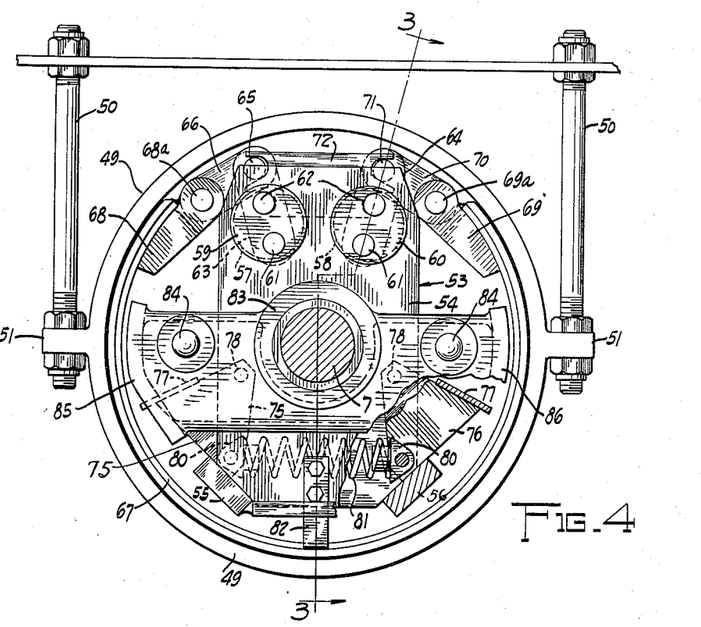
Figure 4 is a side view showing largely the mechanism of the brake and clutch unit as seen in Figure 3 and taken about on the line 4—4 of Figure 3 looking in the direction of the arrows.

Referring to the drawings, it will be noted that at the second end of the spider 53 the side plates 54 are provided with coaxial bores or seats 57 and 58, the seats 57 receiving bearing discs 59 located in the upper left corner of the spider 53 as seen in Figure 4 and the seats 58 receiving bearing discs 60. In each instance the discs 59 and 60 are coaxial or in alignment as they are received in their respective seats, and they are of identical constructions. Each bearing disc has two openings therein for receiving pins 61 and 62, it being understood that the pins 61 and 62 are mounted in said openings of each pair of corresponding discs 59 and 60. Four of the pins 61 and 62 are provided, in all, for each of the brake units.

As shown in the drawings, the linkage means of the illustrated construction for affecting application of the brake means is associated with each pair of the discs 59 and 60 and mounted upon the pins 61 and 62 of such pair of discs. Forming a part of the linkage are a pair of lever members 63 for the discs 59 and a similar pair of lever members 64 for the discs 60.

Force is transmitted from the linkage to the brake means for actuating the latter as an incident to relative movement of the output member or spider 53. In the present instance, the brake means comprises a relatively stationary member and a movable member which when actuated are placed in braking engagement to hold the movable member against movement relative to the stationary member. In the construction shown in the drawings, a friction type of brake means as illustrated, and comprises the stationary brake drum 49 and a brake band 67. For applying actuating forces to the brake means, force transmitting connections are provided between the linkage means and the ends of the brake band 67. To accomplish this, the lever members 63 have a pin 65 passing transversely therethrough and also through the adjacent end of a link 66 connected to the adjacent or associated end of a brake band 67. The link 66 is connected to an end member 68 attached to said associated end of the brake band 67 by pin 68a. In like manner the other end of the brake band 67 has attached thereto the attachment member 69 which is pivotally connected with a link 70 by a pin 69a in turn connected by a pin 71 with the outer end of the lever members 64 of the discs 60. As will become apparent from the following description of the operation of the linkage means of the preferred embodiment, the connection between the linkage and the brake means serve to transmit pushing or compressive forces from and to the brake band 67.

Figure 20:
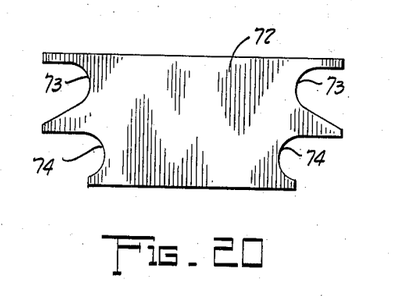
Figure 20 is a side view of the floating operating links two of which are carried by the main spider and interposed between the ends of the brake band of each brake and clutch unit.
Figure 21:
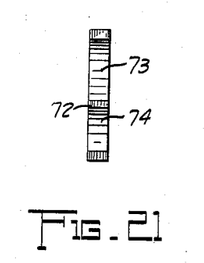
Figure 21 is an end view of the members shown in Figure 20.
Figure 22:
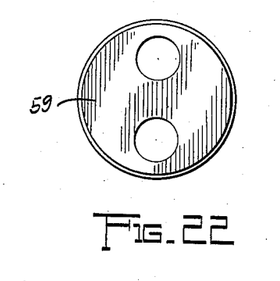
Figure 22 is a side view of one of the bearing discs a pair of which is used for each of the energizing units located near the upper end of the main spider.
Figure 23:
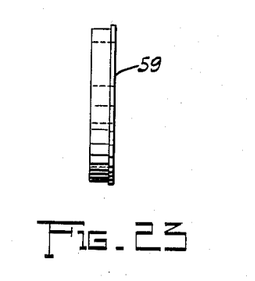
Figure 23 is an edge view of the disc illustrated in Figure 22.

In addition to the links or lever members 63, 64, the linkage means of the exemplary construction includes an intermediate force member for interconnecting lever members 63, 64. Between and supported upon the pins 62 and 61 of the discs 59 and the pins 62 and 61 of the discs 60 is located a floating shifting plate 72 the form of which is best shown in the Figures 20 and 21 of the drawing. A pair of such plates 72 is employed and may be seen in section in their proper location in Figure 3 of the drawing. The plates 72 are formed at the ends with outer notches or recesses 73 laterally registering with each other, and inner recesses 74 similarly registering. The outer recesses 73 of the plate 72 are adapted to engage the pins 65 and 71 connected with the brake band end members 68 and 69 respectively by means of links 66 and 70, and pins 68a and 69a and the recesses 74 are adapted to receive the cross pins 62 of each set of lever members 63 and 64.

Figure 18:
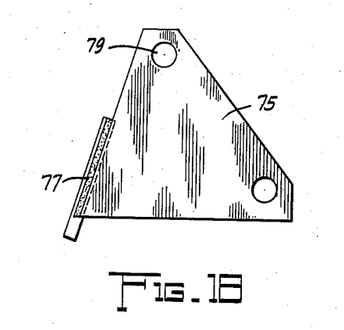
Figure 18 is a side view of one of the equalizing members carried by the main spider of the brake and clutch units, two of such members being mounted on the spider and having interposed therebetween a comparatively light equalizing spring.
Figure 19:
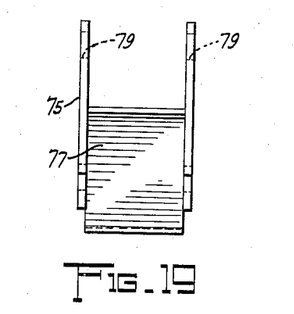
Figure 19 is a view of the member shown in Figure 18 looking from the right as said member is illustrated in Figure 18.

To insure application of the brake means when no power is transmitted through the mechanism, means are provided for equalizing or centering the drive mechanism. Between the lower ends of the side plates 54 of the main spider as this spider is seen in Figure 4 are mounted equalizing members 75 at the left of the view and 76 at the right of the view. Each of these equalizing members is of the construction as shown in Figures 18 and 19 of the drawings and comprises spaced side plates connected by a cross-web 77. The members 75 and 76 are pivotally supported to swing between the sides 54 of the main spider 53 by pivot pins 78 passing through openings or holes 79 in each member 75 and 76. Spring seat members 80 are pivotally connected with the lower end portions of the members 75 and 76 as seen in Figure 4 and a light coiled spring 81 is mounted at its end on said seat members 80 and acts as an equalizing spring in a manner to be later more fully set forth. Attached to the end of the main spider 53 between the abutments 55 and 56 previously referred to is a guide or contact arm 82 which is adapted to slide at its free end relatively to the lining of the brake band 67 and acts to maintain said lining and band in its proper position within the brake drum 49.

Between the main jaw clutch 40 and the brake drum 49, and primarily located between the member 40 and the adjacent side plate 54 of the main spider 53 is a floating, input coupling member 83 which largely comprises a hub portion receiving the traction shaft 7 with a suitable bearing therebetween, said coupling member comprising arms extending radially from the hub portion as seen best in Figures 4, 5, and 15 and 16. The coupling member 83 at the inner side thereof is equipped with pins 84 extending laterally from each of the arms thereof on opposite sides of the axis hub of the member. Said pins 84 are adapted to enter suitable elongated openings 40a in the associated main clutch jaw or disc 40, herein referred to as a jaw clutch member, when said member 40 is shifted axially upon the traction shaft 7 to which it is splined. Extending from the opposite ends of the coupling member 83 in a direction opposite to the direction of extension of the pins 84 are abutment members 85 and 86 forming with abutment members 55, 56 on the spider 53 alternately operative force connections.

It will be seen that according to the assembly of the coupling member 83 between the main clutch member 40 and the adjacent side of the main spider 53, that the abutment members 85 and 86 project laterally so as to lie in positions in which they are engageable with the abutments on the main spider 53 the abutment member 85 co-operating with the abutment member 55 of said spider and the abutment member 86 co-operating with the abutment 56 of the spider. Likewise the abutment members 85 and 86 co-operate respectively with the end members 68 and 69 which are attached to the ends of the brake band 67 to form brake releasing connections. In other words the abutment members 85 and 86 operate each between an abutment on the main spider 53 and one of the end members attached to the brake band, the coupling member having floating movement to enable the abutting actions of the members 85 and 86 with the parts previously described as co-operating directly therewith.

Figure 5:
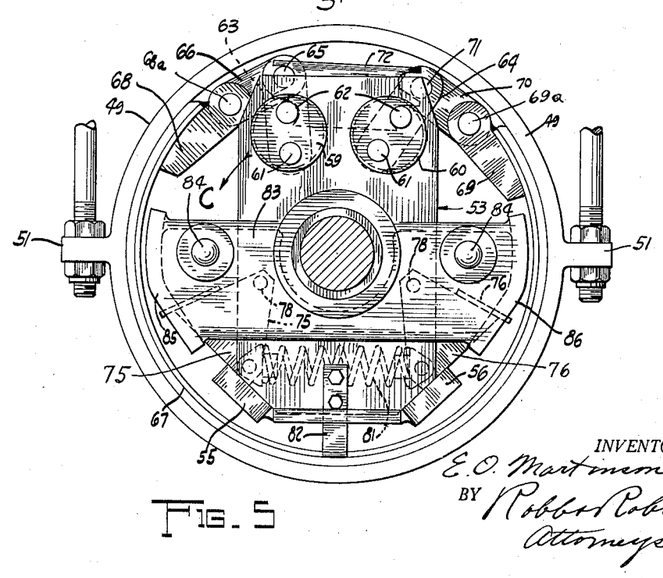
Figure 5 is a view similar to Figure 4 illustrating largely the same parts as shown therein but depicting the position of the parts when the brake means of the unit are engaged and no driving force is imparted to the driving shaft.

As seen best in Figure 4 the action of the light coil spring 81 is to co-operate with the equalizing members 75 and 76 to cause the engagement of the cross-web 77 of said equalizing members with notched portions of these respective abutments 85 and 86 whereby to tend to hold the coupling member 83 in the position in which it is shown in Figure 4. The lowermost portion of the abutment 85 of the coupling member 83 has the construction as illustrated in Figures 4 and 5 and is adapted to coact with the upper portion of the abutment 55 on the main spider 53, and the lowermost portion of the abutment member 86 is adapted similarly to coact with the upper portion of the abutment 56 on the spider 53 during certain operative phases of the action of the mechanism.

The operation of the mechanism thus far described will now be set forth dealing with the operation of both of the power transmission and brake units A and B as incorporated in the machine of Fig. 1.

It should be noted that the brake portion of each of the power transmission and brake units above referred to, is automatically operable incident to the application of driving power to the traction shaft 7 to release the braking action, and to a small initial movement of the output member after withdrawal of said driving power from said shaft to apply the braking action. There is no necessity for availing of any powerful spring members to compel frictional engagement of the brake lining carried in the respective unit with the drum in order to effectuate both the braking and steering operations or either of them.

Each of the brake bands 67 of the respective units A, B, is formed so as to be initially of somewhat slightly larger diameter than the interior diameter of the drum with which it is associated and thus contact of the lining mounted on the band with the drum may be said to be a normal condition of the same, since the band must be slightly contracted at its ends in order to insert the same within the drum which is fixed as has been previously pointed out.

The above described relationship is one which is not intended to effectuate any substantial braking force at any time but is availed of in a manner which will be subsequently clear in conjunction with reference to the operation of other of the parts in each of the units and may be referred to as initial non-braking contact. Further it should be noted that the lining on each band and each band itself is of substantially great length so to speak and is thus enabled to be maintained in peripheral contact with a substantial portion of the drum during the operation of the mechanism. It is this contact which is availed of to effect certain of the operating phases more particularly pointed out hereinafter.

Assuming that the steering lever 24 of the exemplary machine is in the position shown in Figure 1, with the engine 2 in operation, driving force is being imparted to the traction shaft 7. Further the normal condition of the jaw clutch members 40 is that in which the same are in engagement with the pins 84 of the coupling members 83, as shown by unit A of Figure 1, which coaction will impart equal drive force to both of the coupling members 83 through said pins. At this time the manual clutch lever 24 is in the neutral position, to permit or effectuate the normal straight ahead driving action of the machine, the drive being imparted equally to both of the power transmission and brake units A and B through the members 40 previously mentioned. This of course will in turn cause rotation of the sprockets or gears 45 and transmission of driving power to both of the crawlers upon which the machine is supported. It should be noted that each of the units will operate exactly in the same manner in this forward driving movement, and referring to Figure 6 it will be seen that each coupling member 83 has been rotated for example in a contra-clockwise direction, whereby the abutment 86 at its upper portion initially comes into engagement with the brake band end member 69. The abutment action above described immediately causes what may be termed a contraction of the brake band 67, to maintain the band in released condition as long as the driving force is continued through the coacting coupling member. The foregoing applies to both of the units A and B. It should be understood that the initial rotation of the coupling member 83 contra-clockwise, causes the abutment of the member 86 and the band end member 69, and immediately subsequent thereto, the abutment member 85 at its lower edge portion engages the abutment 55 of the main spider 53. The effect is that an initial movement of the input coupling member 83 moves the spider 53 and the linkage means to a central or neutral position relative to the brake band 67 and releases the brake means to permit rotation of the output member or spider so long as power is transmitted by the input coupling. Thus the main spider 53 is rotated as a unit, and since the sleeve 44 upon which the same is mounted, is in turn connected to the sprocket or gear 45, the driving force is transmitted from the sprocket 45 to each crawler, it being remembered that both of the clutch members 40 are operating in the same direction under the condition being described and the driving force is transmitted from the sprockets 45 to the crawlers 48 at each side of the machine.

In the event that forward progress of the machine is to be interrupted, all that is necessary is that the operator move lever 89 into neutral so as to eliminate the driving force on the traction shaft 7. This action is one which takes place simultaneously in both of the units A and B upon such elimination of driving force transmitted to the traction shaft 7 and immediately upon such action taking place, the bands 67 are permitted to come into rubbing contact with the drums 49. The above condition outlined is illustrated more particularly in Figure 5, wherein the brake band 67 has been permitted to come into the rubbing contact with the drum 49 which will provide frictional resistance to further rotation of the band. Thus as seen in Figure 5, the spider 53 tending to continue to rotate in the direction of the arrow C, there will be relative rotation between the member 68 on the end band and said spider. The member 68 is connected by the link 66 to the servo device including the lever members 63, applying a push or compressive force on the pin 65 and causing the lever members and their bearing discs 59 to rotate in a clockwise direction. The rotation of the lever members 63 about their coaxial pivotal connections or fulcrums in a clockwise direction, will in turn impart through the pin 65 a pushing force to the floating plates 72, which plates 72 in turn transmit that force to the pin 62. The said pin 62 will in turn cause rotation of the servo device bearing discs 60 in a clockwise direction, which rotation will thus be imparted to the pin 71, and cause the member 69 on the end of the band 67 to also be moved in a clockwise direction by means of the link 70, to separate the ends of the band. Thus in view of the fact that the end member 68 of the brake band 67 has been retarded sufficiently to act as a dead end, movement of the member 69 will be seen to cause the band 67 to expand in contact with the inner periphery of drum 49 for braking and stopping effect.

It will be noted that the lever arms of pins 62 about their respective pivots or fulcrums are shorter than the lever arms of pins 65 and 71. As a result, a small movement of pin 65, when applied through floating plate 72 to pin 62 of lever members 64, causes a substantially larger movement of pin 71. This, in effect, expands the linkage moving pins 65 and 71 farther apart. Thus, a small relative movement of the spider 53 toward the end 68 of the brake band 67 results in a substantial movement of the opposite end 69 of the brake band to expand the band into full braking engagement. It should also be noted that the force causing the linkage to expand or change its shape is the reaction force of the output member attempting to turn against the resistance offered by the brake means. Consequently, the force available to expand and apply the brake means increases as the resistance to turning presented by the brake means increases, and because of the action of the linkage means, a cumulative or servo braking action is obtained. Thus the relatively small frictional resistance, above referred to as initial non-braking contact, acting on the linkage means builds up almost instantaneously to full braking contact between the brake band 67 and drum 49.

If the machine is being stopped on a down-grade, there will obviously be an increased tendency for the spider 53 to rotate counter-clockwise, which in view of the fact that the brake band 67 is now in non-rotative position, would cause a further separation of the respective end members 68 and 69, imparting sufficient braking force to the lining of the band to effectively hold the machine from any forward movement whatsoever. The machine will be held in this position as long as no further driving force is imparted to the spider by the traction shaft 7 to cause a retraction of the brake band 67 and lining thereon from the drum 49.

It will thus be seen that the above described action is essentially a servo-action on the part of the brake band lining acting through the band and the linkage and servo devices at the ends of the band so as to work with great power upon the levers 63 and 64 of the units 59 and 60. The brake applying action hereinabove described is substantially instantaneous, and in no way depends upon the application of powerful spring forces to the brake bands to carry out the brake applying functions, as heretofore proposed in the art. The functioning of the brake parts hereinabove described is in no way dependent or controlled by the direction of movement of the machine, but the said brake application is equally effective in either of opposite directions of travel of the machine. However the end of the brake band at the end member 69 becomes the dead end of the band and the end member 68 becomes the live end during such reverse movement or travel of the machine.

The construction and arrangement of the bearing discs 59 and 60 in conjunction with the lever members 63 and 64, mounted upon the respective pin members 61 and 62, afford particular advantage in providing compactness of arrangement and especially powerful leverages upon actuation by the servo functioning of the brake band and its connected parts.

Figure 6:
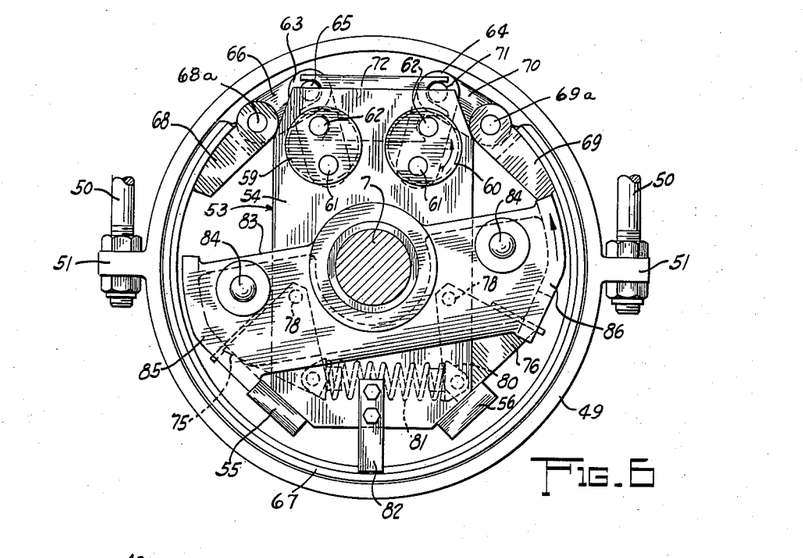
Figure 6 is a view similar to Figure 5 showing the adjustment of the parts of one of the brake and clutch units as when the brake is released and driving force is being transmitted through the clutch to the associated driving gear or sprocket of one of the crawlers.
Figures 7, 8:
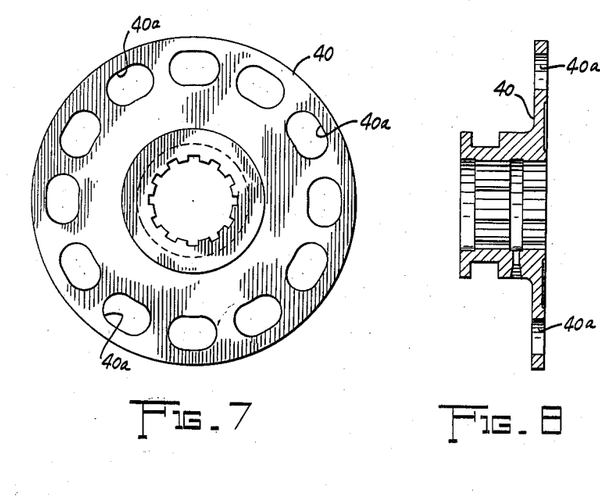
Figure 7 is a side elevation view of one of the shiftable clutch members on the traction shaft and one of which may be supplied for each of the power transmission and brake units.
Figure 8 is a vertical sectional view of the clutch members shown in Figure 7.
Figure 9:
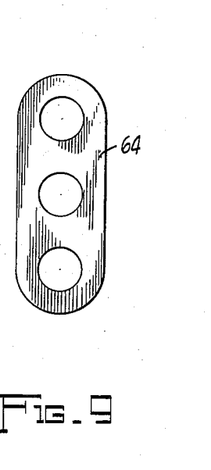
Figure 9 is a detailed view in elevation of one of the lever members of one of the energizing units two of which are carried by the upper portion of the main spider of each clutch and brake unit.

Incidental to the operation of the brake and clutch units, is the action of the equalizing members 75 and the equalizing spring 81 mounted therebetween. Referring to Figure 6 it will be noted that in this condition of the brake and clutch elements, the coupling member is in contact at one of the abutments 86 with the end member 69 as previously explained, and thus the equalizing member 75 at the left hand part of the said view has been moved so as to contract or compress the spring 81. Thereafter when the drive has been removed as has also been explained, if for some reason there is a certain amount of friction in the gearing which does not permit the abutment member 86 to move out of contact with the end member 69, the equalizing effect takes place. This is as a result of the expansion of the spring 81 to its normal condition, which causes relative rotation between the spider 53 and the coupling member 83, so as to at least move the coupling member slightly with relation to the spider and thus permit the expansion of the brake band 67 so as to subsequently permit the application of braking force explained in detail previously. It will be apparent that when the abutment member 85 is in contact with the brake band end member 68, upon reverse driving of the machine, a reverse action of the equalizing members will take place, so as to also overcome friction in the bearings and gearings to permit or cause the abutment member 85 to at least move sufficiently away from the brake band end member 68 to permit the rubbing contact of the band 67 for subsequent application of braking force through the servo-action already described in detail.

The steering action of the mechanism will next be described, in conjunction with the disclosure of Figure 1. For the purposes of this description, it will be understood that the Figure 1 view is one which is taken from the rear of the machine, and it is desired to cause the machine to turn to the right.

Such rightward turning movement is effected by manipulation of the lever 24 in one direction from its neutral position, so as to cause withdrawal of the jaw clutch member 40 from engagement with the pins 84 of the coupling member 83 of the unit B. Thus the parts are in the condition shown in the Figure 1 view with the member 40 out of contact with the pins 84. This movement or retraction of the clutch member 40, permits the operation of the brake elements previously described referring to the band 67 thereof which is permitted to move into rubbing contact with the drum, speaking with regard to the band of the unit B so as to permit the servo-action to effectively operate the linkage and levers 63 and 64 of that unit and effectively cause expansion of the band 67 and bring the sprocket or gear member 45 to a stop from its previously rotating condition. This will obviously cause stopping action of any kind of traction member being driven by such gear or sprocket of the unit B.

It will be understood that the unit A has been in no manner affected by the foregoing operation, driving of the clutch member 40 thereof and the coupling 83 associated therewith imparting suitable rotative movement to the gear or sprocket member 45 of the spider with which the same is connected and correspondingly the traction member driven by sprocket 45 of the unit A. Thus the machine will be caused to turn toward the right under the propulsive action of the traction member driven by the unit A.

If it should be desired to cause the machine to turn towards the left, subsequently, manipulation of the clutch member 40 of the unit A will be resorted to, by operation of the lever 24 in the opposite direction from the neutral direction and from the direction previously mentioned, to permit the application of braking forces in the unit A. Of course the clutch member 40 of the unit B will remain in driving engagement with the pins 84 under such conditions and in turn transmit the driving action through the sprocket or gear 45 of that unit to the associated traction member.

If it is desired to vary the turning radius of the machine, as for instance in turning the machine toward the right as previously described, it will be necessary to intermittently cause engagement of the clutch member 40 with the pins 84 of the unit B, so as to alternately transfer driving forces to that unit and withdraw the same therefrom. This will effect an intermittent operation of the associated brake parts, to permit application of braking forces and remove such braking forces alternately to the sprocket or gear member 45 being operated by the said unit B. Conversely it will be apparent that in order to vary the turning radius of the machine toward the left similar manipulation of the clutch member 40 of the unit A will be resorted to, so as to alternately effect operation of the gear or sprocket member 45 transferring driving action to the traction member associated therewith. The foregoing manipulations of the respective clutch members 40 of the units A or B will be made under the control of the lever 24, manipulated to effect such operation by the operator of the vehicle. The braking effect of both of the units A and B is equally effective upon both of the traction members being driven by the sprockets or gears 45 to completely stop and maintain the machine in stopped condition, when the driving force is removed from the traction shaft 7, as for example by disengaging the gears 10 and 12 upon manipulation of the lever 15, or in any other way in which the driving effect may be removed from the shaft 7, as for example by disengaging the main clutch of the motor or even turning the motor off. The main clutch of the motor is indicated at 87, as being controlled by the lever 88 associated therewith.

In the operation of the mechanism of the invention, there is no requirement to provide adjusting devices for taking up the wear on the lining of the band 67 on each of the units, A and B, in view of the unique linkage arrangement which automatically compensates for such wear throughout the life of the lining.

Generally stated, the novel brake and clutch units of my invention are so constructed as to maintain the brake elements thereof in condition for operation at all times regardless of the direction of operation or even the static condition of the machine, said brake elements being operable either upon removal of driving force to the clutch members associated therewith or in the event the machine is already at rest, to become instantly operable to prevent movement of the machine unless and until driving force is applied.

Further, if the brakes are in applied condition, it is necessary to again initiate driving operation of the traction shaft, to effect the release of either or both as long as the machine has any tendency to move. It will thus be seen that the brakes are automatically effective to restrain movement of the machine on a gradient or against reactions set up by operation of other parts of the machine as for example a digging unit carried thereby.

Tendency of the machine to move without use of the driving power of its motor, will cause the relative rotation of the driving members 45 and the brake instrumentalities thus energizing the servo devices of the latter setting up the counteracting brake forces that hold the machine stationary, such operation being wholly automatic.

It will be understood that the shaft 8a having the gear 8 may be driven by a conventional change speed and reversing gear connected to the shaft of motor 2 and unit 90 controlled by the lever 89 located adjacent to the clutch unit 87—88. The change speed and reversing gear includes the usual neutral position.

One of the important features of this invention is that once the upper machinery has been adjusted to effect travel, it is only necesary to manipulate the lever 89 to cause the machine to move straight ahead or straight reverse. The lever 24 is only used to steer the machine to the right or left. An important consequence of this arrangement is that no brake lever is necessary, since the braking action is automatic when the lever 89 is moved to a neutral position, thus saving time and effort on the part of the operator.

Where travel speed of the machine is greater and/or frictional forces less than those generally considered herein, operation of the brakes may be caused to take place by throttling the engine so as to reduce the rotational speed of the traction shaft 7. The effect of this action, if the machine continues to move, thus compelling rotation of the spiders 53 with respect to the coupling members 83 connected to clutch members 40 which are mounted on the splines of shaft 7, is to cause the separation of the abutments 86, for example, on the members 83, from the brake band end members 69 as in Figure 6.

The brake bands thus expand into rubbing contact with their respective drums and in turn act thereafter through the servo devices to apply braking force to the drums in the manner previously described.

I claim:

1. Driving mechanism for traction means of vehicles, comprising a driving shaft, means to impart rotation to said shaft in opposite directions, separate driving members loosely mounted on said shaft, brake means including spaced fixed brake drums, one for each of the driving members, brake and clutch units for each drum including a friction brake band coacting with each drum adapted for normal non-braking frictional engagement therewith, a spider fixed to each of the driving members, servo-operating units on each spider and comprising lever members pivoted to the spider and each connected to one associated end of the brake band, a clutch member for each spider fixed to the shaft, to rotate therewith, a movably supported coupling member on said shaft adjacent to each clutch member and having clutch parts engageable by the adjacent clutch member, end members on the end of the brake band each providing the connection means for one end of the band with the lever member of the associated servo-unit, pairs of abutment members on opposite portions of the coupling member, one abutment member of each pair being movable to engage one end member of the band and the other opposite abutment member being engageable with the spider when said coupling member is turning in one of opposite directions, for causing the first abutment member to engage its brake band end member to release brake application of the brake band on movement of the coupling member by its associated clutch member, and for causing the second abutment member to turn the spider and its driving member when said abutment member engages said spider incident to said movement of the coupling members by its clutch member, means to effect such clutching engagement of each clutch member with its coupling members, said brake bands each including means to effect non-braking engagement thereof with the associated brake drum to energize its associated connected servo-operating device to effect braking engagement of the brake band to restrain movement of the associated driving member, said means including a floating shifting plate between and engageable with the lever members of the servo-units.

2. Driving means as claimed in claim 1, combined with equalizing members on each spider bearing against opposite ends of the coupling member, and a spring on the spider acting on said equalizing members and normally tending to cause the abutment members of the coupling member, co-operative with the end members of the brake band, to move to spaced relation respecting the end members.

3. A power transmitting and braking mechanism comprising, in combination, a coupling member adapted for rotation in opposite directions, brake means including a relatively stationary brake drum and a coacting movable brake band having brake releasing abutments on the respective end portions thereof, an output member adapted for rotation in opposite directions having a pair of abutments thereon, servo-operating means on said output member including a pair of force transmitting link members pivoted to said output member and having force transmitting connections with the respective end portions of said brake bands, said servo-operating means also including a floating member interposed between said force transmitting link members and adapted to expand said links away from each other for transmitting force from either end portion of said brake band to the other end portion of said brake band for actuating said brake means upon movement of said output member relative to said brake band, a first pair of abutment members on said coupling member, each of said first abutment members being positioned to engage a respective one of said abutments on said brake band for releasing said brake means upon rotation of said coupling member in either direction of rotation, and a second pair of abutment members on said coupling member, each of said second abutments being positioned to engage a respective one of said abutments on said output member in opposite directions of rotation to transmit power to said output member, said brake means being arranged for initial frictional engagement between said drum and band for initially energizing said servo-operating means to effect braking engagement of said brake means to restrain movement of said output member.

4. A power transmitting and braking mechanism, comprising in combination, a coupling member adapted for rotation in opposite directions, brake means including a relatively stationary brake drum and a coacting internal brake band, an output member adapted for rotation in opposite directions, brake applying linkage means including force transmitting members interposed between said output member and said brake band and adapted for movement relative to each other upon movement of said output member relative to said brake band for expanding said brake band into braking engagement, a first means on said coupling member for releasably engaging said brake band for releasing said brake means upon rotation of said coupling member in either direction of rotation, and a second means on said coupling member for releasably engaging said output member in either direction of rotation to transmit power to said output member, said brake means being arranged for initial frictional engagement between said drum and band upon disengagement of said first means on said coupling to initially restrain said brake band and permit relative movement between said output member and said brake band, and to provide an initial force to said linkage means for expanding said brake into braking engagement.

5. A power transmitting coupling comprising, in combination, an output shaft, a stationary brake drum, a brake band positioned within said drum, a spider mounted on said output shaft for rotation therewith, linkage means interconnecting said spider and the respective end portions of said brake band for expanding said band into frictional engagement with said drum upon movement of said spider from a neutral position relative to said band, a coupling member adapted to be coupled to a source of power for selective rotation thereby, said coupling member having means for releasing said brake band from frictional engagement with said drum and engaging said spider for transmitting power from said input to output shafts, and means for centering said coupling member upon decoupling of said member from said input shaft to permit relative movement of said spider into braking position.

6. A power transmitting and braking mechanism comprising, in combination, an input coupling member and an output member mounted for independent rotation, brake means including a relatively stationary member and a coacting movable member, a first force transmitting connection between said coupling member and said movable brake member for releasing said brake upon rotation of said coupling member relative to said movable brake member, a second force transmitting connection between said coupling member and output member adapted to transmit force from said coupling member to said output member upon rotation of the former, and a brake energizing means including a force transmitting linkage movably connected to said output member and adapted to change its shape upon movement relative to said output member, said movable brake member having an initial frictional contact with said relatively stationary brake member and having a first means for engaging said force transmitting linkage upon movement of said output member relative to said movable brake member to change the shape of said force transmitting linkage, said movable brake member having a second means positioned to be engaged by said force transmitting linkage upon change of shape of the latter for transforming the frictional force of said initial braking contact into a brake applying force and applying the latter to said movable brake member to resist further movement of said output member.

7. A power transmitting and braking mechanism comprising, in combination, an input coupling member and an output member mounted for independent rotation, brake means including a relatively stationary member and a coacting movable member, a first force transmitting connection between said coupling member and said movable brake member for releasing said brake upon rotation of said coupling member relative to said movable brake member, a second force transmitting connection between said coupling member and output member adapted to transmit force from said coupling member to said output member upon rotation of the former, and a brake energizing means including a force transmitting linkage, said linkage having a first and second means for engaging said movable brake member, said first engaging means being interposed between said output member and said movable brake member for transmitting brake reaction force to said linkage and cause said second engaging means to move relative to said first engaging means, said second engaging means being positioned for movement by said linkage in a direction to transmit said reaction force to said movable brake member for increasing the application of said brake means, said movable brake member having an initial frictional contact with said relatively stationary brake member for effecting control movement of said linkage in a direction to apply said brake means.

8. In a driving mechanism of the class described in combination, a source of power, a drive shaft selectively driven in reverse directions by said source of power, traction devices, a clutch driven by said drive shaft for each of said traction devices, and a power coupling and brake mechanism interposed between each of said clutches and traction devices, said power coupling and brake mechanism including an input coupling member driven by said clutch, an output member for driving said traction devices, a brake means for holding said output member stationary, a coupling member for sequentially releasing said brake means and driving said output member, said coupling member and brake means being adapted for effecting initial braking engagement of said brake means when said clutch is disengaged, and linkage means for transforming the braking force of said initial braking engagement into a braking applying force upon movement of said output member relative to said brake means.

9. In a driving mechanism of the class described, a drive shaft, means to rotate said shaft, a traction driving member operable by said shaft, brake means including a stationary brake drum and a friction brake member coacting therewith, a spider fixed to said driving member, a servo-operating unit interposed between said spider and said friction brake member for transmitting brake reaction force to said friction brake member as a brake applying force to increase coaction between said brake members, a clutch member driven by said drive shaft, a movably supported coupling member engageable with said brake member for releasing the latter and maintaining said servo-operating unit in an inoperative condition during such engagement, means for moving said clutch member into clutching engagement with said coupling member to drive said coupling member and release said brake means, said coupling member having means for driving said spider upon engagement of said clutch and movement of said coupling member to release said brake means, said brake means and servo-operating unit being adapted for initial non-braking coaction of said brake means to initially energize said servo-operating unit.

10. A power transmitting and brake mechanism comprising, in combination, an input member, an output member, a releasable brake having a first relatively stationary member and a second coacting relatively movable member, means for transmitting force between said second brake member and said output member for applying a force to said output member to limit relative movement between said output member and said second brake member, said first and second braking members adapted for initial engagement to provide an initial braking force for said output member to initiate braking action, means for transmitting the force limiting the relative movement of said output member into a brake applying force to cause furthere braking engagement of said first and second braking members, and means for transmitting driving force from said input member to said output member and for releasing said brake members upon transmission of the driving force.

References Cited in the file of this patent

UNITED STATES PATENTS

| | | |
|---|---|---|
| 2,031,186 | Still | Feb. 18, 1936 |
| 2,318,286 | Brey et al. | May 4, 1943 |
| 2,379,071 | Faust et al. | June 26, 1945 |
| 2,525,402 | Dehn | Oct. 10, 1950 |
| 2,641,343 | Bennett | June 9, 1953 |